Jan. 15, 1924.
A. R. ROCHE
SPRING DEVICE
Filed Sept. 6, 1922
1,480,694
2 Sheets-Sheet 1
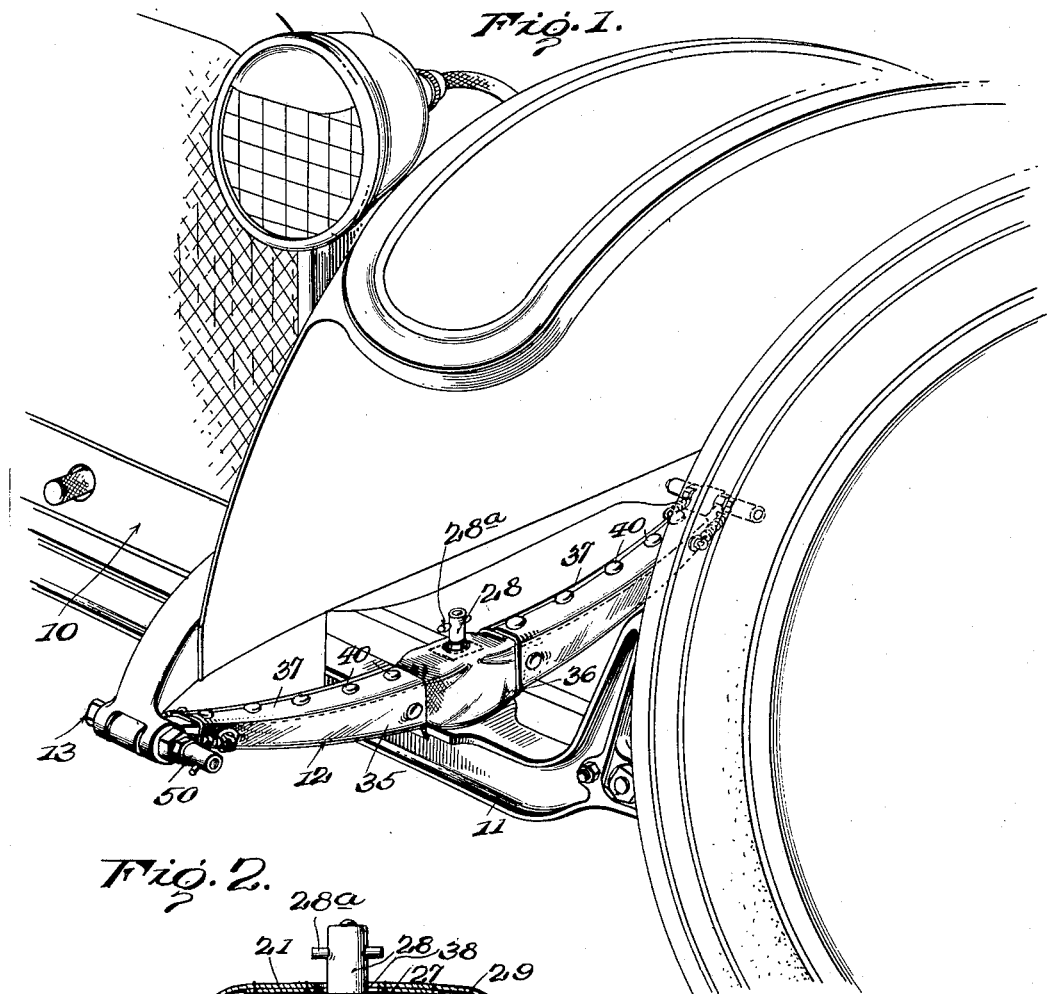
INVENTOR
A. R. Roche.
BY
ATTORNEYS Jan. 15, 1924.
A. R. ROCHE
1,480,694
SPRING DEVICE
Filed Sept. 6, 1922   2 Sheets-Sheet 2
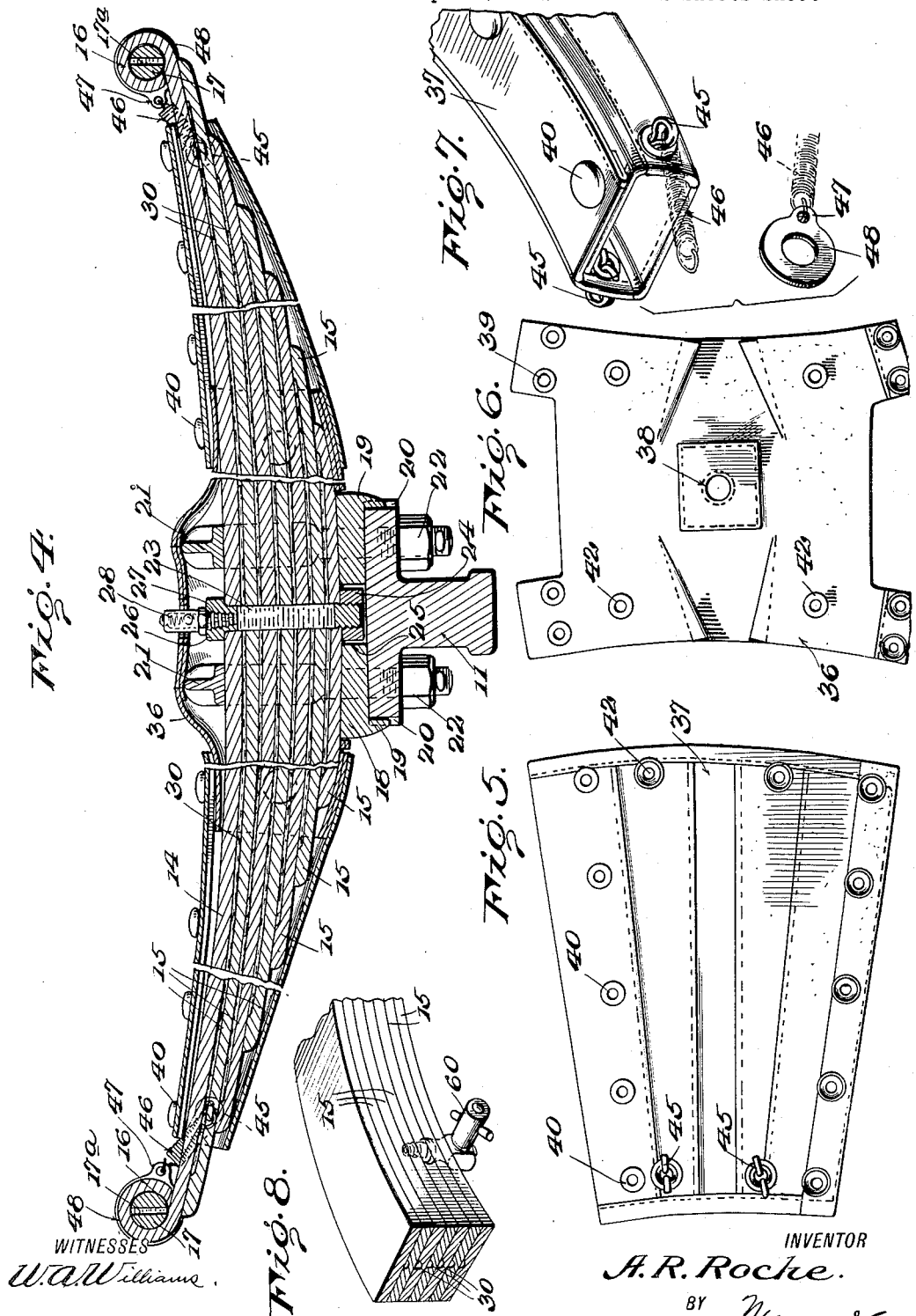
INVENTOR
A. R. Roche.
BY
ATTORNEYS Patented Jan. 15, 1924.

1,480,694

UNITED STATES PATENT OFFICE.

ALFRED R. ROCHE, OF CASPER, WYOMING.

SPRING DEVICE.

Application filed September 3, 1922. Serial No. 586,467.

*To all whom it may concern:*

Be it known that I, ALFRED R. ROCHE, a citizen of the United States, and a resident of Casper, in the State of Wyoming, have invented certain new and useful Improvements in Spring Devices, of which the following is a specification.

This invention relates in general to spring devices, and more particularly to an improvement in leaf springs especially adapted for use with automobiles or similar vehicles.

The object of the invention is to provide a leaf spring of this character which is so constructed and organized as to be completely housed and protected from the deteriorating action of the weather or of dirt, dust or other foreign matter and which is at the same time thoroughly lubricated in that a film of lubricant is provided and maintained in between the leaves of the spring, the lubricant being first supplied to the interstices between the leaves and such lubricant afterwards working out around the spring so as to completely bathe the spring in lubricant whereby the cushioning properties as well as the strength and durability of the spring are greatly enhanced.

Another object is to provide a device of this character having these advantages and at the same time being of simple and durable construction, reliable in operation and easy and comparatively inexpensive to manufacture and apply.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 1 is a fragmentary perspective view, showing an embodiment of the invention;

Figure 2 is a view in transverse central section of the embodiment shown in Figure 1, parts being shown in elevation for the sake of illustration;

Figure 3 is a view in transverse section, on line 3—3 of Figure 1;

Figure 4 is a view in central longitudinal section, parts being shown in elevation for the sake of illustration;

Figure 5 is a view in elevation, showing one of the end sections of the jacket or covering;

Figure 6 is a similar view of the central section of the jacket or covering;

Figure 7 is a group view in perspective, showing the spring tensioning device for the end sections; and Figure 8 is a fragmentary view in perspective showing the elbow connection utilized with one form of spring suspension.

Referring to the drawings wherein for the sake of illustration is shown the preferred embodiment of the invention, the numeral 10 designates generally the body of an automobile or similar vehicle and the numeral 11 designates the axle thereof. A leaf spring, indicated generally at 12, is supported upon the axle 11 and is connected with the body, as at 13.

The leaf spring 12 is made up of a main leaf 14 and a plurality of other leaves 15 organized with each other in the usual manner. The main leaf 14 is arranged uppermost of the leaves and terminates at its end in eyes 16 through which bolts 17 extend, the bolts being adapted to co-operate with the frame and with the shackle in the usual manner. The lowermost leaf 15 rests on a bed plate 18 which surmounts the axle 11 and which is prevented from displacement on the axle by means of lugs 19 seated in notches 20 on the axle. U-shaped clips 21 and nuts 22 coact with the leaf spring and with the axle to secure the leaf spring to the axle and to hold the leaves thereof assembled.

The leaves of the spring 12 are formed with centrally located and vertically alined openings which receive a bolt 23, the lower end of which carries a nut 24 received in an opening 25 provided in the plate 19, the nut 24 also engaging the lowermost leaf 15. At its upper end the bolt 23 is provided with a head 26 engaging the main leaf spring and the head 26 coacts with the nut 24 to hold the bolt in desired relation with respect to the leaf spring. The upper end of the bolt 23 and its head 26 is provided with an axially extending passage 27 into the outer end of which is threaded a valved nipple 28, the lower or inner end of the passage 27 communicating with a diametrical slot 29 which extends entirely across the bolt and for a substantial portion of the length thereof. This diametrical slot 29 communicates at each side with longitudinally extending grooves or distributing passages 30 formed in the upper faces of the leaves 15, the distributing passages or grooves 30 extending from each side of the central opening of each leaf 15 to a point slightly spaced from the corresponding end of the leaf, as clearly shown in Figure 4.

The construction thus far described provides for the thorough and efficient lubrication of the spring for with this construction the coupling of a conventional grease gun may be advantageously associated with the nipple 28 which is of conventional construction and which include laterally extending pins 28ª adapted to coact with the bayonet slots of the grease gun coupling. With the grease gun so coupled with the nipple 28, the grease or lubricant may be forced under high pressure through the passage 27 and slot 29 into the distributing grooves or passages 30. The lubricant feeds along these passages to the ends thereof and then spreads laterally in both directions from the groove so as to be completely distributed over the interstices between the leaves to form a complete film of lubricant between the engageable faces of the leaves. Moreover the lubricant eventually finds its way out from the sides of the leaf spring and so completely covers the spring.

In order to prevent loss of the lubricant and to protect the spring from the action of the weather and from the bad effects of dust, dirt or foreign matter a jacket designated generally at 35 is provided. This jacket is made up in general of a central section, designated at 36, and a pair of end sections of identical construction and designated at 37. These sections are all constructed of fabric treated or woven so as to be impervious to oil and moisture. The fabric is flexible and is adapted to be folded around the spring. The section 35 includes an opening 38 which accommodates the nipple 28 and the meeting ends of this section 36 are united or connected with each other beneath the spring by snap fasteners 39. The sections 37 are folded around the spring and the meeting ends of these sections are united along the top of the spring by snap fasteners 40. As shown in Figure 4 the inner ends of the sections 37 overlap adjacent portions of the section 36 and these overlapping portions of the sections 37 and 36 are releasably secured to each other by snap fasteners 42. The sections 36 and 37 are of such form as to snugly fit around the spring and completely enclose it and by uniting the meeting ends of the section 37 along the top of the spring the bottom of the jacket or covering is substantially seamless and precludes waste or escape of lubricant.

The outer end of each section 37 has associated therewith a tensioning device for pulling its section of the jacket toward the end of the spring and properly maintain the same thereon. These tensioning devices are of identical construction and are provided in duplicate, there being one such tensioning device for the outer end of the section 37.

Each tensioning device includes a pair of eyes 45 secured to the side walls of the section 37 adjacent the outer end thereof. A pair of retractile coil springs 46 is provided, one such coil spring being arranged at each side of the jacket and one end of each coil spring being connected with an eye 45. The other ends of the coil springs are connected to the apertured lugs 47 provided on the rings 48 and these rings 48 are mounted for angular adjustment on the bolts 17. The rings are arranged so as to be clamped in adjusted position when the nuts on the bolts are tightened, and in this manner the tension of the springs 46 may be regulated. At the end of the spring where the spring connection is between the body or frame and the spring, one ring 48 is interposed between the head of the bolt and the adjacent portion of the frame and the other ring is arranged between the nut and the adjacent portion of the frame, whereas at the other end of the spring, one ring 48 is arranged between the head of the bolt and a shackle link while the other ring 48 is arranged between the nut and the other shackle link. The bolts 17 are preferably of substantially the same construction as the bolt 22, these bolts 17 having nipples 50 associated therewith and supplying lubricant to the slots 17ª of the bolts when the grease gun is connected with the nipple, it being understood that the slots 17ª corresponds to the slot 29 of the bolt 23 and communicates with the nipple 50 in the same manner in which the slot 23 communicates with the nipple 28, and in this manner the spring connection is lubricated.

It is obvious that these tensioning devices not only hold the jacket in proper position on the spring but also permit of normal flexion of the spring during the cushioning action thereof without interfering with this action on part of the spring and without allowing the jacket to be injured by virtue of this movement. The jacket 35 or the sections thereof may be readily removed from the spring to permit of inspection thereof or to provide for access thereto, the springs being readily disengageable from the eyes and the snap fasteners being readily released to permit of this operation.

It is to be understood that various forms of nipples corresponding to the nipple 28 in Figure 4 and the nipple 50 in Figure 1, may be utilized and for the sake of illustration there is shown in Figure 8 a nipple 60 taking the form of an elbow and adapted to be connected up with the bolt corresponding to the bolt 23 in Figure 4, this form of nipple being especially adapted for use with the spring which is inverted in assembly as may be readily seen by comparing Figures 4 and 8.

I claim:

1. In a device of the character described, a leaf spring and a jacket enclosing said leaf spring and comprising a center section and end sections, and flexible and elastic tensioning devices coacting with the outer ends of the end sections of the jacket for holding said end sections in proper position while permitting flexion of said springs.

2. In a device of the character described, a leaf spring having spring connections associated with each end thereof, a jacket enclosing said leaf spring and comprising a center section and end sections and a tensioning device associated with each end section for holding the same in proper position while permitting unrestrained flexion of the spring, each of said tensioning devices including a pair of coil springs associated with the outer end of an end section, each of said coil springs being connected at one end to the portion of the outer end of its end section, the opposite end of each coil spring being adjustably connected to the spring connection whereby the tension of the coil springs may be varied.

3. In a device of the character described, a leaf spring and a jacket enclosing said leaf spring, said jacket being constructed of fabric and comprising a center section folded around the leaf spring and having its meeting ends overlapping around the bottom of the leaf spring, snap fasteners for releasably securing said overlapping ends together, and end sections folded around the leaf spring and having their meeting ends overlapping along the top of said leaf spring, said end sections also overlapping portions of said center section, snap fasteners for releasably securing the end sections to the center section, and snap fasteners for releasably securing the meeting ends of the end sections together.

4. In a device of the character described, a leaf spring and a jacket enclosing said leaf spring, said jacket being constructed of fabric and comprising a center section folded around the leaf spring and having its meeting ends overlapping around the bottom of the leaf spring, snap fasteners for releasably securing said overlapping ends together, and end sections folded around the leaf spring and having their meeting ends overlapping along the top of said leaf spring, said end sections also overlapping portions of said center section, snap fasteners for releasably securing the end sections to the center section, and snap fasteners for releasably securing the meeting ends of the end sections together, and tensioning devices for holding said end sections in proper position while permitting flexion of said spring.

ALFRED R. ROCHE.